United States Patent
Lee

(10) Patent No.: US 9,283,967 B2
(45) Date of Patent: Mar. 15, 2016

(54) ACCURATE CURVATURE ESTIMATION ALGORITHM FOR PATH PLANNING OF AUTONOMOUS DRIVING VEHICLE

(71) Applicant: GM GLOBAL TECHNOLOGY OPERATIONS LLC, Detroit, MI (US)

(72) Inventor: Jin-Woo Lee, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/333,144

(22) Filed: Jul. 16, 2014

(65) Prior Publication Data
US 2016/0018229 A1    Jan. 21, 2016

(51) Int. Cl.

| | |
|---|---|
| G06F 7/00 | (2006.01) |
| B60W 40/072 | (2012.01) |
| G01C 21/34 | (2006.01) |
| B60W 30/12 | (2006.01) |
| B60W 30/14 | (2006.01) |
| B60W 30/10 | (2006.01) |

(52) U.S. Cl.
CPC .............. *B60W 40/072* (2013.01); *B60W 30/10* (2013.01); *B60W 30/12* (2013.01); *B60W 30/14* (2013.01); *G01C 21/34* (2013.01); *B60W 2550/143* (2013.01); *B60W 2550/146* (2013.01); *B60W 2750/30* (2013.01)

(58) Field of Classification Search
CPC ... B60W 40/072; B60W 30/10; B60W 30/12; B60W 30/14; G01C 21/34

USPC ..................................... 701/409, 70; 345/589
See application file for complete search history.

(56) References Cited

U.S. PATENT DOCUMENTS

| | | | |
|---|---|---|---|
| 7,084,882 B1 * | 8/2006 | Dorum .................... | G01C 21/32 345/589 |
| 8,170,739 B2 | 5/2012 | Lee | |
| 8,428,843 B2 | 4/2013 | Lee | |
| 2003/0036842 A1 * | 2/2003 | Hancock ................ | G01C 21/20 701/532 |
| 2014/0244125 A1 * | 8/2014 | Dorum .................... | G01C 21/32 701/70 |

* cited by examiner

*Primary Examiner* — Adam Tissot
(74) *Attorney, Agent, or Firm* — John A. Miller; Miller IP Group, PLC

(57) ABSTRACT

A method for identifying roadway curvature that includes determining a range of interest and collecting shape points from a map database from a current position of the vehicle to an end of the range of interest that define the location of the roadway. The method converts the shape points from World Geodetic System 84 (WGS84) coordinates to UTM coordinates, and then fits a single set of polynomial equations to define a curve using the converted shape points. The method determines whether the single set of polynomial equations exceeds a predetermined curvature accuracy threshold, and if so, fits multiple sets of polynomial equations to multiple roadway segments over the range of interest using the converted shape points. The method then determines the roadway curvature at any roadway location using solutions to the multiple sets of polynomial equations.

19 Claims, 3 Drawing Sheets

ACCURATE CURVATURE ESTIMATION ALGORITHM FOR PATH PLANNING OF AUTONOMOUS DRIVING VEHICLE

BACKGROUND OF THE INVENTION

1. Field of the Invention

This invention relates generally to a system and method for identifying the curvature of a roadway using map database shape points and, more particularly, to a system and method for identifying roadway curvature in a semi-autonomous or autonomously driven vehicle using map database shape points and a multi-point polynomial curve fitting algorithm.

2. Discussion of the Related Art

The operation of modern vehicles is becoming more autonomous, i.e., vehicles are able to provide driving control with less and less driver intervention. Cruise control systems have been on vehicles for a number of years where the vehicle operator can set a particular speed of the vehicle, and the vehicle will maintain at that speed without the driver operating the throttle. Adaptive cruise control systems have been recently developed in the art where not only does the system maintain the set speed, but also will automatically slow the vehicle down in the event that a slower moving preceding vehicle is detected using various sensors, such as radar and cameras. Certain modern vehicles also provide autonomous parking where the vehicle will automatically provide the steering control for parking the vehicle. Some vehicle systems intervene if the driver makes harsh steering changes that may affect vehicle stability. Some vehicle systems attempt to maintain the vehicle near the center of a lane on the road. Further, fully autonomous vehicles have been demonstrated that can drive in simulated urban traffic up to 30 mph, observing all of the rules of the road.

As vehicle systems improve, they will become more autonomous with the goal being a complete autonomously driven vehicle. For example, future vehicles probably will employ autonomous systems for lane changing, passing, turns away from traffic, turns into traffic, etc. Smooth maneuvering and automated lane centering and lane changing control is important for driver and passenger comfort in autonomously driven vehicles. However, as a result of sensor and actuator latency, measured vehicle states may be different from actual vehicle states. This difference may cause improper path generation, which will affect lane changing harshness.

U.S. Pat. No. 8,170,739 issued May 1, 2012, titled, Path Generation Algorithm for Automated Lane Centering and Lane Changing Control System, assigned to the assignee of this application and herein incorporated by reference, discloses a system for providing path generation for automated lane center and/or lane changing purposes. The system employs one or more forward-looking cameras that detect lane markings in front of the vehicle for identifying a travel lane on which the vehicle is traveling. The road marking information detected by the cameras is used to determine a center lane of the vehicle that can be used to identify the curvature of the roadway, the heading angle of the vehicle, location of the vehicle, etc. A desired path generation processor receives the signals from the camera, vehicle state information and a steering angle of the vehicle, and a request for a vehicle lane change. The system also includes a path prediction processor that predicts the vehicle path based on the vehicle state information including vehicle longitudinal speed, vehicle lateral speed, vehicle yaw-rate and vehicle steering angle. The desired path information and the predicted path information are compared to generate an error signal that is sent to a lane change controller that provides a steering angle signal to turn the vehicle and reduce the error signal, where the path generation processor employs a fifth-order polynomial equation to determine the desired path of the vehicle based on the input signals.

The systems discussed above typically require knowledge of the roadway curvature to provide smooth vehicle path planning. It is known in the art to use a GPS receiver and associated map database on a vehicle for identifying the curvature of the roadway on which the vehicle is traveling. The GPS receiver identifies the location of the vehicle by latitude and longitude on the Earth and the map database uses that location to reconcile what roadway the vehicle is on and provides a number of shape points identifying the location of the roadway also in latitude and longitude around the vehicle. The available shape points in the map database are typically spaced apart depending on the curvature of the roadway, where the shape points are more closely spaced together for greater curved roads. The shape points can be connected by a line, and by fitting the line to a curve equation, the curvature of the roadway can be determined, where the curvature of the line travels through each of the shape points identified by database. However, because there are errors in the survey of the roadway, the map database shape points may not be exactly at the center of the roadway and may be somewhat off the roadway, which creates errors in the curve that is generated by the shape points.

Because the shape point locations have errors, the curvature of the line between the shape points may not accurately identify the proper radius of curvature of the road at any particular location. Because the outliers in the shape points in the map database are significant enough to cause the radius of curvature of the road to be significantly inaccurate, known techniques for identifying roadway curvature using map database shape points cannot be reliably employed.

SUMMARY OF THE INVENTION

The present disclosure describes a system and method for identifying roadway curvature in a vehicle system that uses shape points from a map database. The method includes determining a range of interest for determining the roadway curvature and collecting the shape points from the map database from a current position of the vehicle to an end of the range of interest that define the location of the roadway. The method converts the shape points from World Geodetic System 84 (WGS84) coordinates to UTM coordinates, and then fits a set of single polynomial equations to define a curve using the converted shape points. The method determines whether the single polynomial equations exceed a predetermined curvature accuracy threshold, and if so, fits multiple sets of polynomial equations to multiple contiguous roadway segments over the range of interest using the converted shape points. The method then determines the roadway curvature at any roadway location using solutions to the multiple polynomial equations.

Additional features of the present invention will become apparent from the following description and appended claims, taken in conjunction with the accompanying drawings.

BRIEF DESCRIPTION OF THE DRAWINGS

FIG. 2 is an illustration of a vehicle traveling along a roadway and showing map database shape points along the roadway;

DETAILED DESCRIPTION OF THE EMBODIMENTS

The following discussion of the embodiments of the invention directed to a system and method for determining roadway curvature using map database shape points is merely exemplary in nature, and is in no way intended to limit the invention or its applications or uses. For example, as discussed herein, the system and method of the invention have particular application for a semi-autonomous or autonomously driven vehicle. However, as will be appreciated by those skilled in the art, the invention may have non-automotive applications.

Figure 1:
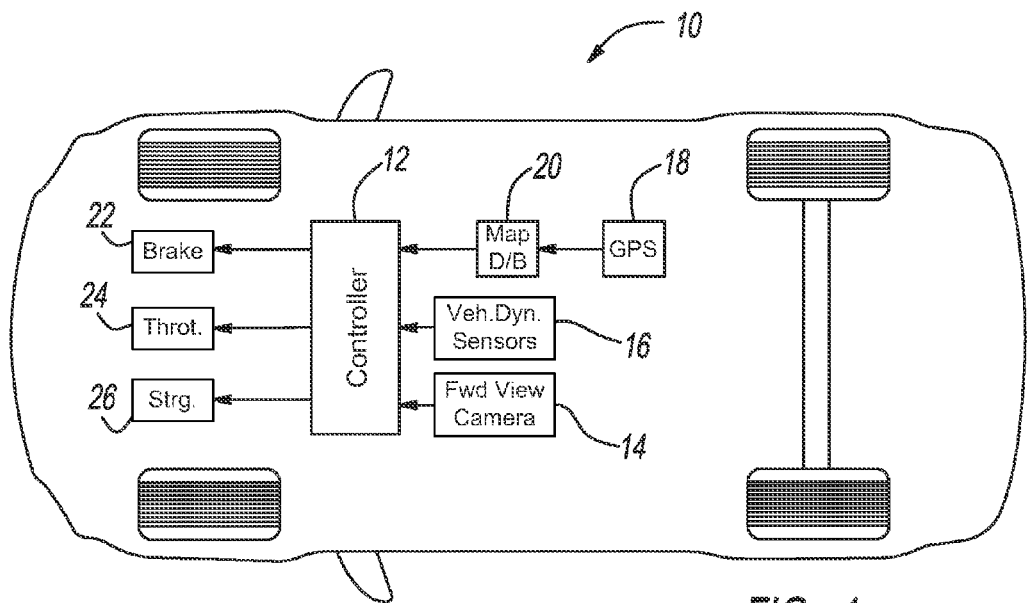
FIG. 1 is an illustration of a vehicle including components necessary for calculating roadway curvature.

FIG. 1 is an illustration of a vehicle 10 including a controller 12 that performs all of the necessary processes, calculations, algorithms, etc. discussed herein to provide path prediction, generation and control of the vehicle 10 driven in a semi-autonomous or autonomous manner, where the controller 12 can be any number of independent or combined processors, electronic control units (ECUs), devices, etc. The controller 12 receives signals from one or more forward-looking vision cameras 14 that detect lane markings and objects on or in the roadway or otherwise in front of the vehicle 10, where the camera 14 can be any suitable detection device for this purpose, such as a charge-coupled device (CCD) camera, complementary metal oxide semiconductor (CMOS) video image sensors, etc. The vehicle 10 also includes a number of sensors, represented generally as sensor 16, that provides vehicle motion information including, but not limited to, vehicle speed, yaw-rate, steering angle, lateral and longitudinal acceleration, lateral and longitudinal speed, etc. The vehicle 10 further includes a GPS receiver 18 that receives GPS signals identifying the location of the vehicle 10, which are provided to a map database 20 that provides an indication to the controller 12 of the location of the vehicle 10 on the roadway, for example, as spaced apart roadway shape points. Based on the desired path of the vehicle 10 and whether the vehicle 10 is being semi-autonomously or autonomously driven, the controller 12 may provide output signals to a vehicle brake system 22, a vehicle throttle 24 and/or a vehicle steering system 26.

FIG. 2 is an illustration 40 showing a vehicle 42 that is being autonomously driven on a lane 46 of a roadway 44 along a center of the lane 46. The illustration 40 shows a number of shape points 50, represented by $(P_1, P_2, \ldots, P_N)$, along the roadway 44, where the shape points 50 are provided by the map database 20 to represent the roadway 44, and where the shape points 50 generally follow the center of the lane 46. However, as discussed above, as a result of errors in the roadway surveying process, some of the shape points 50 may not be accurately at the center of the lane 46, and may not even be in the lane 46, referred to herein as outlier shape points.

As will be discussed in detail below, the present invention uses the shape points 50 to determine or estimate roadway curvature generally shown by line 52, where the number N of the shape points 50 that are used depends on many factors, such as the speed of the vehicle 42, curvature of the roadway 44, etc. The roadway curvature is determined for a particular range of interest, which may vary depending on what the curvature is being used for. For example, lane centering, lane changes, evasive maneuvers, etc. may require a long curvature preview range, where the range of interest can be a few kilometers, and where the longer the range, the more processing time is required. Further, the range of interest includes the roadway curvature behind the vehicle 42 as well as ahead of the vehicle 42, where a typical range may be 150 m behind the vehicle 42 and 300 m in front of the vehicle 42.

Figure 3:
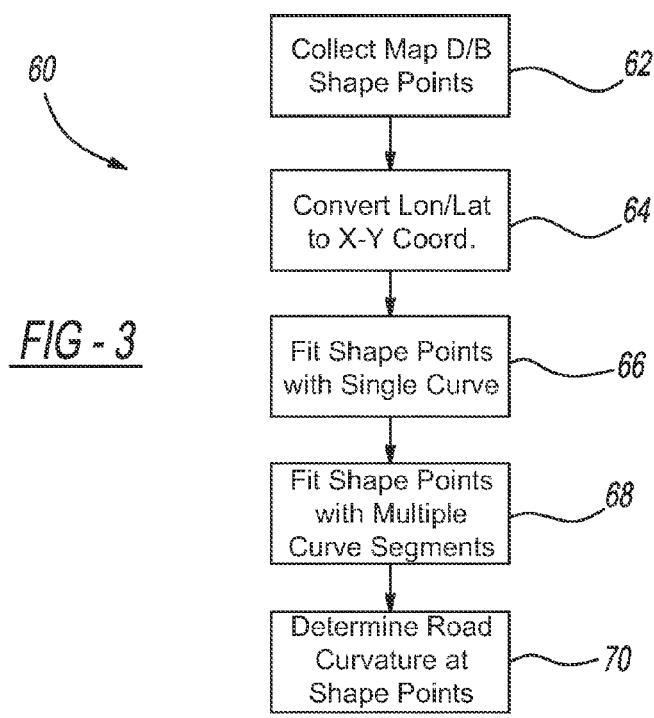
FIG. 3 is an overview flow diagram showing a process for determining roadway curvature using map database shape points.

FIG. 3 is a flow chart diagram 60 showing a general overview of a process for determining roadway curvature using the map database shape points 50. At box 62, the algorithm collects the map database shape points 50, where each shape point 50 is represented as a longitude (Lon) and a latitude (Lat) in World Geodetic System 84 (WGS84):

$$\begin{matrix} Lon_1 & Lat_1 \\ \vdots & \vdots \\ Lon_N & Lat_N \end{matrix} \tag{1}$$

The longitudinal and latitudinal identification of each of the shape points 50 is in three-dimensions, i.e., has an x, y and z designation, where the (Lat, Lon) coordinate system gives locations on the surface of the Earth. The algorithm is only interested in the curvature of the roadway 44 in the x and y coordinates, and as such, the algorithm converts the longitude and latitude of each point 50 into Universal Transverse Mercator (UTM) coordinates (x, y) at box 64. As is well understood by those skilled in the art, UTM is a projected coordinate system that uses a two-dimensional Cartesian coordinate system. The x,y coordinates in the UTM are the global coordinates where x represents the east direction and y represents the north direction.

The algorithm then attempts to fit those shape points 50 within the range of interest to a single curve, represented by the line 52, for each x and y shape point 50 as a function of arc length s at box 66, where the shape points $(P_1, P_2, \ldots, P_N)$ are in UTM coordinates within the predetermined range of interest, and where each shape point $P_i$ has a (x, y) coordinate value, i.e., $P_i=(x_i, y_i)$. In one embodiment, the algorithm attempts to find a single third-order polynomial curve that best fits all of the N collected shape points 50 as:

$$\hat{x}(s) = p_{13} \cdot s^3 + p_{12} \cdot s^2 + p_{11} \cdot s + p_{10}, \tag{2}$$

$$\hat{y}(s) = q_{13} \cdot s^3 + q_{12} \cdot s^2 + q_{11} \cdot s + q_{10}, \tag{3}$$

where s is the arc length, i.e., the distance between any two of the shape points 50, and is defined by:

$$s_{i+1} = s_i + \sqrt{(x_{i+1}-x_i)^2 + (y_{i+1}-y_i)^2}, \text{ for } i=1, \ldots, N-1 \tag{4}$$

and where $S_1=0$ and the coefficients are unknowns in equations (2) and (3) and are determined by minimizing the cost function J as:

$$J = \frac{1}{2} \sum_{i}^{N} [(x_i - x_1 - \hat{x}_i)^2 + (y_i - y_1 - \hat{y}_i)^2]. \tag{5}$$

Based on this analysis, there will be N−1 equations and eight unknowns. By minimizing the cost function J in equation (5), the solution of the equations can be found as:

$$\begin{bmatrix} p_{13} & q_{13} \\ p_{12} & q_{12} \\ p_{11} & q_{11} \\ p_{10} & q_{10} \end{bmatrix} = \qquad (6)$$

$$\begin{bmatrix} \sum_{j=1}^{N_i} s_j^6 & \sum_{j=1}^{N_i} s_j^5 & \sum_{j=1}^{N_i} s_j^4 & \sum_{j=1}^{N_i} s_j^3 \\ \sum_{j=1}^{N_i} s_j^5 & \sum_{j=1}^{N_i} s_j^4 & \sum_{j=1}^{N_i} s_j^3 & \sum_{j=1}^{N_i} s_j^2 \\ \sum_{j=1}^{N_i} s_j^4 & \sum_{j=1}^{N_i} s_j^3 & \sum_{j=1}^{N_i} s_j^2 & \sum_{j=1}^{N_i} s_j \\ \sum_{j=1}^{N_i} s_j^3 & \sum_{j=1}^{N_i} s_j^2 & \sum_{j=1}^{N_i} s_j & \sum_{j=1}^{N_i} 1 \end{bmatrix} \times \begin{bmatrix} \sum_{j=1}^{N_i} x_j \times s_j^3 & \sum_{j=1}^{N_i} y_j \times s_j^3 \\ \sum_{j=1}^{N_i} x_j \times s_j^2 & \sum_{j=1}^{N_i} y_j \times s_j^2 \\ \sum_{j=1}^{N_i} x_j \times s_j & \sum_{j=1}^{N_i} y_j \times s_j \\ \sum_{j=1}^{N_i} x_j & \sum_{j=1}^{N_i} y_j \end{bmatrix}$$

Once the coefficients $p_{13}$, $p_{12}$, $p_{11}$, $p_{10}$, $q_{13}$, $q_{12}$, $q_{11}$ and $q_{10}$ are determined, then the curve line can be determined therefrom.

The single curve fitting process discussed above has limitations in that a single polynomial has poor performance when the road curvature changes often or quickly or the range of interest is too long, where the curve fitting process will not match the shape points 50 accurately enough. In order to overcome this limitation, the present invention provides a multi-segment curve fitting process at box 68, where the range of interest is divided into multiple segments to improve curvature performance. The algorithm needs to determine where the first segment ends that is determined by the single-polynomial curve fitting process and where the next segment begins in a smooth transition.

Figure 4:
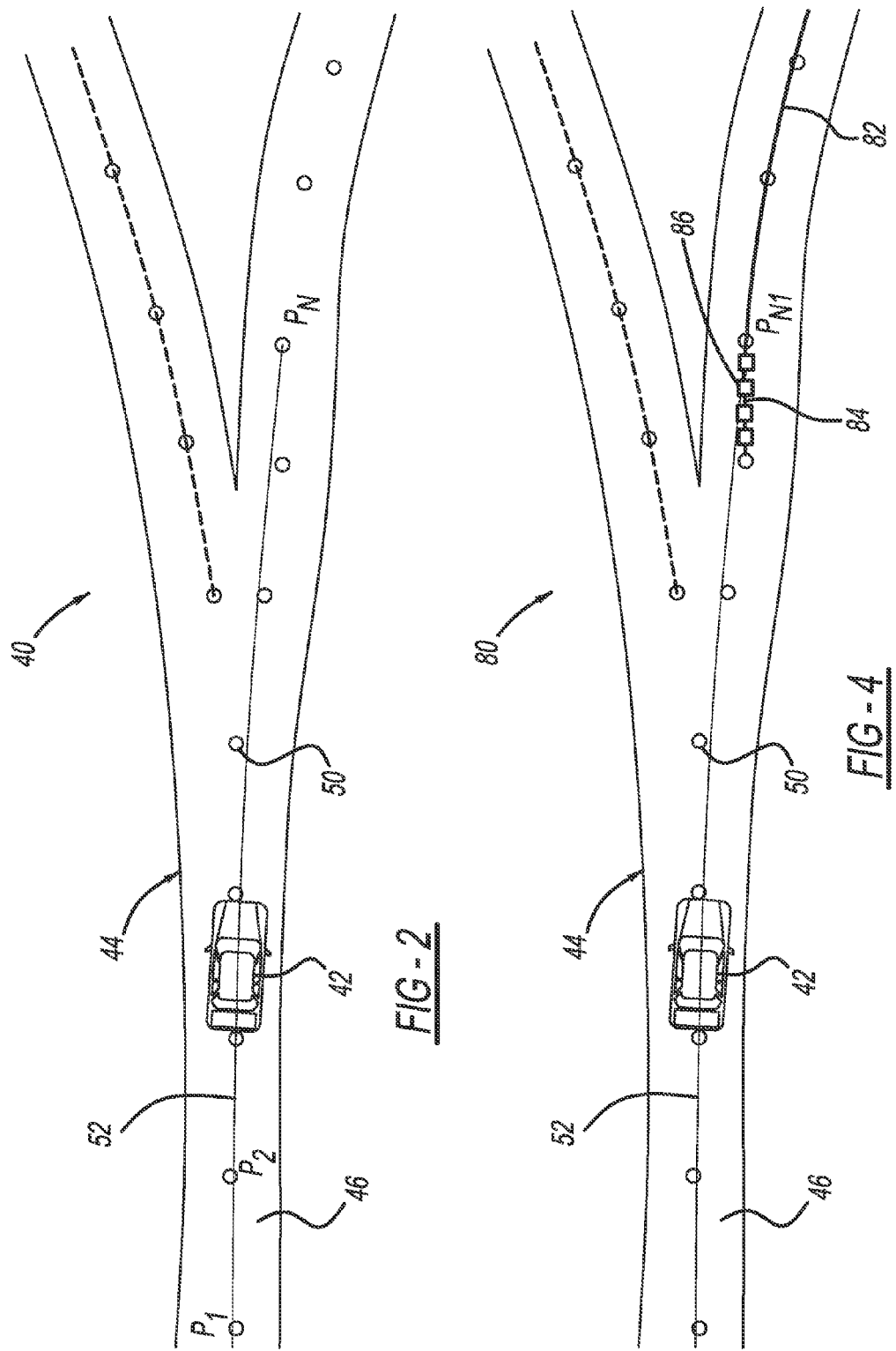
FIG. 4 is an illustration of a vehicle traveling on a roadway and showing multiple curvature segments.

FIG. 4 is an illustration 80 similar to the illustration 40, where like elements are identified by the same reference number that shows a first road curvature segment identified by the line 52 and ending at shape point $P_{N1}$, where the first segment ends when the cost function J exceeds a predetermined threshold $J > J_{thre}$. A second segment represented by line 82 begins at the end point $P_{N1}$ at the end of the first segment line 52. In order to provide a smooth transition between the first segment and the second segment, an overlap section 84 is defined at the end of the first segment line 52 and includes a number of virtual shape points 86. Particularly, when determining the second segment, the algorithm may define the virtual shape points 86, which are not provided by the map database 20, but are determined from the first segment calculated by equations (2) and (3), because the overlap section 84 between the first and second segments may not be long enough, i.e., 50 m or so, to include map database shape points, thus requiring the virtual shape points 86. Since the first segment is already determined, the virtual shape points 86 at the end of the first segment are calculated and used for the second segment. The length of the overlap section 84 and the number of the virtual points 86 are calibrated parameters depending on the particular application.

As above, for the second segment curve fitting process, the algorithm selects a new set of shape points 50 starting from $P_{N1}$ with a predetermined number N2 of the shape points 50 from the map database 20 and the second segment curve is determined by the third-order polynomial equations:

$$\hat{x}(s) = p_{23} \cdot s^3 + p_{22} \cdot s^2 + p_{21} \cdot s + p_{20}, \qquad (7)$$

$$\hat{y}(s) = q_{23} \cdot s^3 + q_{22} \cdot s^2 + q_{21} \cdot q_{20}, \qquad (8)$$

where the coefficients $p_{23}$, $p_{22}$, $p_{21}$, $p_{20}$, $q_{23}$, $q_{22}$, $q_{21}$ and $q_{20}$ are unknown and are determined in the same manner as discussed above for the first segment using the cost function:

$$J = \frac{1}{2} \sum_{i}^{N2} [(x_i - x_1 - \hat{x}_i)^2 + (y_i - y_1 - \hat{y}_i)^2]. \qquad (9)$$

As discussed, in order to provide a smooth transition from the first segment line 52 to the second segment line 82, the algorithm includes a number of the shape points 50 at the end of the first segment line 52 and the virtual shape points 86 to be included as part of the second segment line 82 so that there is an overlap between the first segment and the second segment for a smooth transition therebetween. Therefore, a polynomial equation defining the curvature of the road is provided in multiple segments until the end of the desired range at any particular point in time. Depending on the curvature of the roadway 44, the range of interest, etc., more than two segments may be required, where the end of each segment is determined when the cost function J exceeds a predetermined threshold. Thus, the number of sets of polynomial equations required for the number of segments necessary for accurately determining the roadway curvature is automatically determined, which allows complex curved roads, such as S-curves, to be accurately represented by a single set of polynomial equations. The virtual shape points 86 will be determined at the beginning of each segment using the calculations for the previous segment.

Once the polynomial curve fitting equation has been calculated for each segment as discussed above, the algorithm determines the curvature κ of the roadway 44 at any particular shape point $P_i$ at box 70 as:

$$\kappa_i = (\hat{x}'_i \hat{y}''_i - \hat{y}'_i \hat{x}''_i) / \left( \sqrt{\hat{x}'^2_i + \hat{y}'^2_i} \right)^3. \qquad (10)$$

The heading angle $\theta_i$ of the vehicle 42 at point $P_i$ is determined as:

$$\theta_i = a\tan(\hat{y}'_i / \hat{x}'_i), \qquad (11)$$

where:

$$\hat{x}'_i = 3p_{13} \cdot s_i^2 + p_{12} \cdot s_i + p_{11}, \qquad (12)$$

$$\hat{y}'_i = 3q_{13} \cdot s_i^2 + q_{12} \cdot s_i + q_{11}, \qquad (13)$$

$$\hat{x}''_i = 6p_{13} \cdot s_i + p_{12} \cdot s_i, \qquad (14)$$

$$\hat{y}''_i = 6q_{13} \cdot s_i + q_{12} \cdot s_i, \qquad (15)$$

and where $s_i$ is the arc length to point $P_i$ from the origin point $P_1$.

Equations (12)-(15) are used to calculate the curvature κ and the heading angle $\theta_i$ within the first segment. If the curvature κ and the heading angle $\theta_i$ in the second segments are needed, those equations are:

$$\hat{x}'_i = 3p_{23} \cdot s_i^2 + p_{22} \cdot s_i + p_{21}, \qquad (12)$$

$$\hat{y}'_i = 3q_{23} \cdot s_i^2 + q_{22} \cdot s_i + q_{21}, \qquad (13)$$

$$\hat{x}''_i = 6p_{23} \cdot s_i + p_{22} \cdot s_i, \qquad (14)$$

$$\hat{y}''_i = 6q_{23} \cdot s_i + q_{22} \cdot s_i, \qquad (15)$$

Each of the coefficients p and q have been determined by the calculations above for the particular segment, where the first and second derivative of the values x and y are determined as above. Therefore, the algorithm can determine the curvature κ at any distance defined by the arc-length $s_i$ to the point $P_i$ from the location of the vehicle 42 at point $P_1$. In other words, the roadway 44 is represented by parametric equations, and the curvature κ can be calculated at any point regardless of the existence of shape points. For example, if the curvature κ is needed every 10 m, the curvature κ and the heading angle $\theta_i$ can be calculated for $s_i$=10, 20, 30, 40, etc.

Figure 5:
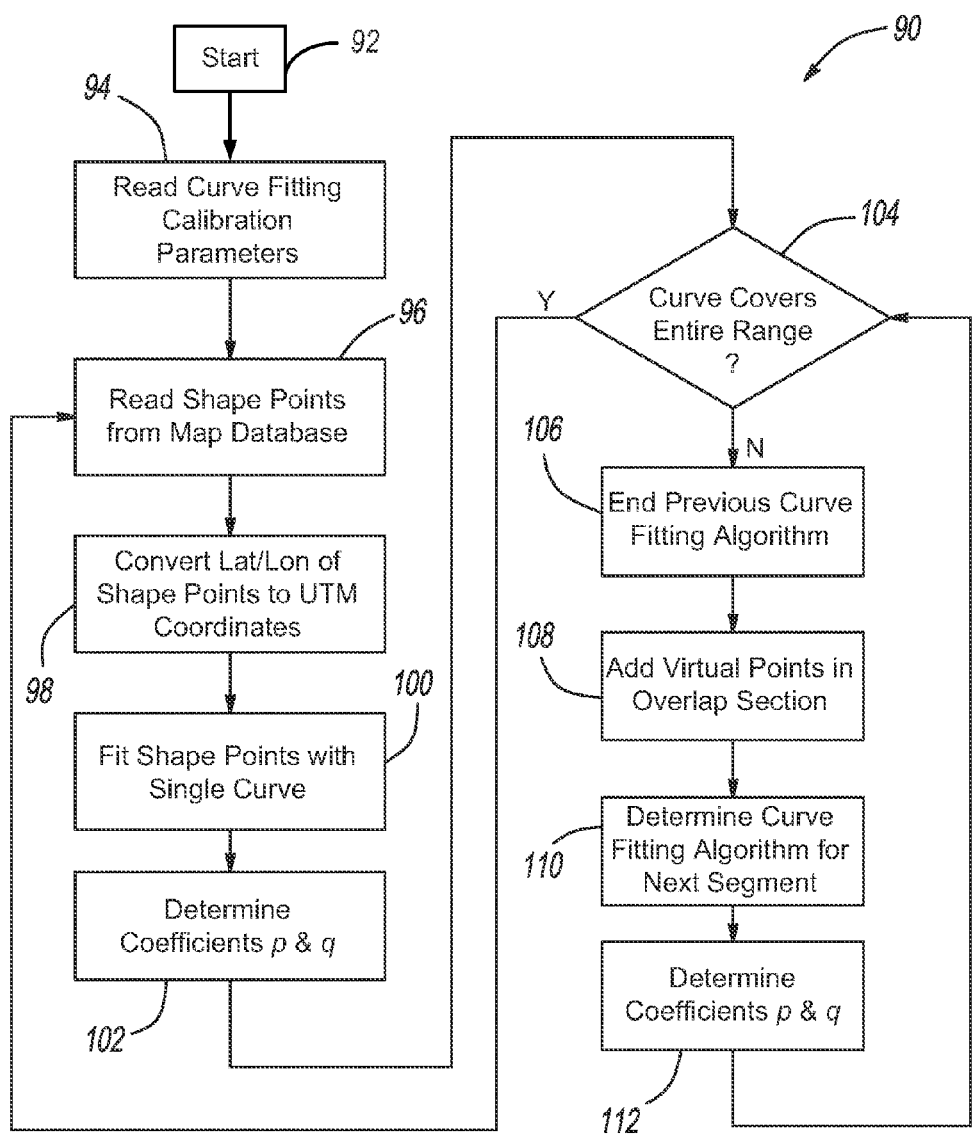
FIG. 5 is a more detailed flow chart diagram showing a process for identifying roadway curvature using map database shape points.

FIG. 5 is a flow chart diagram 90 providing a more detailed discussion of the curve defining process discussed above. The algorithm starts at box 92 and reads the curve fitting calibration parameters at box 94 including the desired range to determine the road curvature κ and the acceptable curve fitting error thresholds. The algorithm then reads the shape points 50 from the map database 20 within the predetermined range at box 96. The algorithm then performs the coordinate transformation to UTM coordinates at box 98. The single curve fitting process for the first segment is performed at box 100 and the parameter coefficients p and q for that segment are determined at box 102. The algorithm then performs a range check at decision diamond 94 to determine if a single segment curve fitting process covers the entire desired range with enough accuracy, and if so, returns to the box 96 to read the shape points 50 from the map database 20 to update the curve as the vehicle 42 moves along the roadway 44. If the first segment cannot accurately cover the desired range within the cost function threshold, then the algorithm ends the previous curve fitting algorithm at box 106, and adds the virtual points 86 in the overlap section 84 at box 108 to determine the next segment in the multi-curve fitting process and provide a smooth transition between segments. The algorithm then determines the curve fitting algorithm for the next segment at box 110 and calculates the parameter coefficients p and q for that segment for those map database shape points 50 at box 112. The algorithm then returns to the decision diamond 102 to determine if the curvature κ calculated by this segment reaches the end of the desired range, and if not, proceeds to calculating a next segment curvature at the box 104.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining roadway curvature in a vehicle system on a vehicle, said method comprising:

determining a range of interest for determining the roadway curvature;

collecting shape points from a map database on the vehicle from a current position of the vehicle to an end of the range of interest that define the location of the roadway, where the shape points are defined by World Geodetic System 84 (WGS84) coordinates;

converting the shape points from the WGS84 coordinates to Universal Transverse Mercator (UTM) coordinates;

fitting a single set of polynomial equations to define a roadway curve using the converted shape points;

determining that the single set of polynomial equations exceeds a predetermined curvature accuracy threshold;

fitting multiple sets of polynomial equations to multiple roadway segments over the range of interest using the converted shape points; and determining the roadway curvature at a roadway location using solutions to the multiple sets of polynomial equations.

2. The method according to claim 1 wherein fitting a single set of polynomial equations includes fitting two third-order polynomial equations to define the roadway curve.

3. The method according to claim 2 wherein fitting a single set of polynomial equations includes fitting two polynomial equations based on arc length, where the arc length is defined as a distance between any two shape points.

4. The method according to claim 3 wherein fitting a single set of polynomial equations includes defining each shape point as:

$$\hat{x}(s) = p_{13} \cdot s^3 + p_{12} \cdot s^2 + p_{11} \cdot s + p_{10},$$

$$\hat{y}(s) = q_{13} \cdot s^3 + q_{12} \cdot s^2 + q_{11} \cdot s + q_{10},$$

where s is the arc length and p and q are unknown coefficients.

5. The method according to claim 4 wherein fitting a single set of polynomial equations includes solving the equations by minimizing a cost function.

6. The method according to claim 5 wherein the cost function is defined as:

$$J = \frac{1}{2} \sum_{i}^{N1} [(x_i - x_1 - \hat{x}_i)^2 + (y_i - y_1 - \hat{y}_i)^2].$$

7. The method according to claim 5 wherein determining that the single set of polynomial equations exceeds a predetermined accuracy threshold includes determining that the cost function minimization exceeds the accuracy threshold.

8. The method according to claim 1 wherein fitting multiple sets of polynomial equations to multiple roadway segments includes separately fitting a single set of polynomial equations to multiple contiguous segments where an overlap section is defined between two segments and where virtual shape points are defined from a previous segment in the overlap section.

9. The method according to claim 8 wherein each set of polynomial equations for each roadway segment is two third-order polynomial equations.

10. The method according to claim 1 wherein collecting shape points from a map database includes collecting shape points that define the roadway behind the vehicle.

11. The method according to claim 1 wherein determining the roadway curvature at any roadway location includes calculating the curvature κ as:

$$\kappa_i = (\hat{x}_i' \hat{y}_i'' - \hat{y}_i' \hat{x}_i'') \Big/ \left( \sqrt{\hat{x}_i'^2 + \hat{y}_i'^2} \right)^3.$$

12. The method according to claim 1 further comprising determining vehicle heading angle based on the solutions to the polynomial equations.

13. The method according to claim 12 wherein determining the vehicle heading angle includes using the equation:

$$\theta_i = a\tan(\hat{y}_i'/\hat{x}_i'),$$

where:

$$\hat{x}_i' = 3p_{13} \cdot s_i^2 + p_{12} \cdot s_i + p_{11},$$

$$\hat{y}_i' = 3q_{13} \cdot s_i^2 + q_{12} \cdot s_i + q_{11},$$

$$\hat{x}_i'' = 6p_{13} \cdot s_i + p_{12} \cdot s_i,$$

$$\hat{y}_i'' = 6q_{13} \cdot s_i + q_{12} \cdot s_i,$$

and where $s_i$ is the arc length to point $P_i$ from origin point $P_1$.

14. A method for determining roadway curvature in a vehicle system on a vehicle, said method comprising:
- collecting shape points from a map database on the vehicle from a current position of the vehicle to an end of a range of interest that define locations of the roadway;
- fitting third-order polynomial equations to define a roadway curve using the shape points;
- determining that the third-order polynomial equations exceed a predetermined curvature accuracy threshold and fitting multiple sets of polynomial equations to multiple contiguous roadway segments over the range of interest using the shape points; and
- determining the roadway curvature at a roadway location using solutions to the polynomial equations or the multiple polynomial equations if used.

15. The method according to claim 14 wherein fitting third-order polynomial equations includes fitting third-order polynomial equations based on arc length, where the arc length is defined as a distance between any two shape points.

16. The method according to claim 14 further comprising converting the shape points from World Geodetic System 84 (WGS84) coordinates to Universal Transverse Mercator (UTM) coordinates before fitting the third-order polynomial equations.

17. A system for determining roadway curvature on a vehicle, said system comprising:
- means for collecting shape points from a map database on the vehicle from a current position of the vehicle to an end of a range of interest that define locations of the roadway;
- means for fitting third-order polynomial equations to define a roadway curve using the shape points;
- means for determining that the third-order polynomial equations exceed a predetermined curvature accuracy threshold and fitting multiple sets of polynomial equations to multiple contiguous roadway segments over the range of interest using the shape points; and
- means for determining the roadway curvature at a roadway location using solutions to the polynomial equations or the multiple polynomial equations if used.

18. The system according to claim 17 wherein the means for fitting third-order polynomial equations fits the third-order polynomial equations based on arc length, where the arc length is defined as a distance between any two shape points.

19. The system according to claim 17 further comprising means for converting the shape points from World Geodetic System 84 (WGS84) coordinates to Universal Transverse Mercator (UTM) coordinates before fitting the third-order polynomial equations.

* * * * *